(12) United States Patent
Li et al.

(10) Patent No.: US 11,038,813 B2
(45) Date of Patent: Jun. 15, 2021

(54) MOCA CONNECTIVITY BETWEEN RF AMPLIFIERS OR SPLITTER DEVICES

(71) Applicant: CommScope Technologies LLC, Hickory, NC (US)

(72) Inventors: Shi Man Li, Mooresville, NC (US); Mark O. Vogel, Statesville, NC (US)

(73) Assignee: CommScope Technologies LLC, Hickory, NC (US)

(*) Notice: Subject to any disclaimer, the term of this patent is extended or adjusted under 35 U.S.C. 154(b) by 310 days.

(21) Appl. No.: 16/058,629

(22) Filed: Aug. 8, 2018

(65) Prior Publication Data

US 2019/0052577 A1   Feb. 14, 2019

Related U.S. Application Data

(60) Provisional application No. 62/542,526, filed on Aug. 8, 2017.

(51) Int. Cl.
| | | |
|---|---|---|
| *H04N 7/10* | (2006.01) | |
| *H04L 12/927* | (2013.01) | |
| *H04B 3/21* | (2006.01) | |
| *H04W 16/20* | (2009.01) | |
| *H04B 1/00* | (2006.01) | |
| *H04L 12/24* | (2006.01) | |

(52) U.S. Cl.
CPC ......... *H04L 47/805* (2013.01); *H04B 1/0067* (2013.01); *H04B 3/21* (2013.01); *H04W 16/20* (2013.01); *H04L 41/5041* (2013.01); *H04N 7/102* (2013.01)

(58) Field of Classification Search
CPC ...................................................... H04N 7/102
See application file for complete search history.

(56) References Cited

U.S. PATENT DOCUMENTS

| | | | |
|---|---|---|---|
| 8,397,271 | B2 | 3/2013 | Riggsby |
| 8,752,114 | B1 | 6/2014 | Shapson et al. |
| 8,792,565 | B2 | 7/2014 | Petrovic |
| 9,699,516 | B2 | 7/2017 | Li |
| 2008/0225902 | A1 | 9/2008 | Chung et al. |
| 2010/0100918 | A1 | 4/2010 | Egan, Jr. et al. |

(Continued)

*Primary Examiner* — Michael H Hong
(74) *Attorney, Agent, or Firm* — Muncy, Geissler, Olds & Lowe, P.C.

(57) ABSTRACT

A bi-directional RF signal amplifier includes a housing with an RF input port. A power divider network within the housing terminates to a plurality of active RF output ports. An active communications path connects the RF input port to the power divider network. A passive communications path connects the RF input port to a passive RF output port. A MoCA input/output port is provided on the housing. A MoCA signal path connects the power divider network to the MoCA input/output port, and a MoCA pass filter is located along the MoCA signal path. In another embodiment, a passive splitter includes a housing with an RF input port, a power divider network, and a plurality of CATV/MoCA RF output ports. A CATV communications path connects the RF input port to the power divider network. A MoCA input/ output port is provided on the housing. A MoCA signal path connects the power divider network to the MoCA input/ output port, and a MoCA pass filter is located along the MoCA signal path.

20 Claims, 12 Drawing Sheets

(56) References Cited

U.S. PATENT DOCUMENTS

| | | |
|---|---|---|
| 2010/0125877 A1 | 5/2010 | Wells et al. |
| 2010/0146564 A1 | 6/2010 | Halik et al. |
| 2010/0162340 A1 | 6/2010 | Riggsby |
| 2013/0002958 A1 | 1/2013 | Labro |
| 2015/0207525 A1* | 7/2015 | Li .................. H04N 7/17309 370/297 |
| 2015/0288920 A1 | 10/2015 | Li |
| 2015/0304732 A1 | 10/2015 | Shapson et al. |
| 2016/0094890 A9 | 3/2016 | Shapson et al. |

* cited by examiner

MOCA CONNECTIVITY BETWEEN RF AMPLIFIERS OR SPLITTER DEVICES

This application claims the benefit of U.S. Provisional Application No. 62/542,526, filed Aug. 8, 2017, which is herein incorporated by reference.

BACKGROUND OF THE INVENTION

1. Field of the Invention

The present invention is directed to a device for providing enhanced MoCA communication between customer devices. More particularly, the present invention relates to an RF amplifier having a MoCA expansion port, and/or relates to a passive splitter having a MoCA expansion port.

2. Description of the Related Art

Cable television ("CATV") networks are known types of communications networks that are used to transmit information between a service provider and a plurality of subscriber premises, typically over fiber optic and/or coaxial cables. The service provider may offer, among other things, cable television, broadband Internet and Voice-over-Internet Protocol ("VoIP") digital telephone service to subscribers within a particular geographic area. The service provider transmits "forward path" or "downstream" signals from the headend facilities of the cable television network to the subscriber premises. "Reverse path" or "upstream" signals may also be transmitted from the individual subscriber premises back to the headend facilities. In the United States, the forward path signals are typically transmitted in the 54-1,002 MHz frequency band, and may include, for example, different tiers of cable television channels, movies on demand, digital telephone and/or Internet service, and other broadcast or point-to-point offerings. The reverse path signals are typically transmitted in the 5-42 MHz frequency band and may include, for example, signals associated with digital telephone and/or Internet service and ordering commands (i.e., for movies-on-demand and other services).

Each subscriber premises typically includes one or more power divider networks that are used to divide the downstream signals received from the service provider, so that the downstream signals may be fed to a plurality of service ports, such as wall outlets that are dispersed throughout the subscriber premises. These power divider networks also combine upstream signals that may be transmitted from one or more of the service ports into a composite upstream signal that is transmitted over the CATV network back to the headend facilities.

A recent trend is to use the coaxial cables that are installed throughout most homes, apartments and other subscriber premises as an "in-premises" network that may be used to transmit signals from a first end device that is connected to a first wall outlet in a subscriber premises to other end devices that are connected to other wall outlets in the subscriber premises. An industry alliance known as the Multi-media Over Coax Alliance ("MoCA") has developed standards which specify frequency bands, interfaces and other parameters that will allow equipment from different standards-compliant vendors to be used to distribute multimedia content over such in-premises coaxial cable networks. These standards specify that such "MoCA" content is transmitted over the in-premises coaxial cable networks in the 850 MHz to 1675 MHz frequency band, although some service providers only distribute MoCA content within a narrower frequency band that is above the cable television band, such as, for example, the 1,125 MHz to 1,675 MHz frequency band. Thus, the MoCA content is transmitted over the in-premises network in a pre-selected MoCA frequency band. The power divider network in the in-premises network may be designed to support communications between its output ports in this pre-selected MoCA frequency band.

Examples of MoCA content that may be distributed over an in-premises coaxial cable network are digital television, video-on-demand programming and digitally-recorded television or music programming. In an exemplary application, such programming may be transmitted via the in-premises network of a home from a primary set-top box (which may be a full service set top box having a digital television receiver, DVR and/or video-on-demand capabilities, etc.) to less capable, less expensive, auxiliary set-top boxes that are installed on other televisions throughout the premises or directly to televisions, DVD players, etc. with MoCA ports. In this manner, the full capabilities of the primary set top box may be enjoyed at all of the televisions within the residence without having to provide a primary set top box for each television.

In many cases, significant attenuation may occur as signals are passed through the cable television network of a service provider, and hence the power level of the RF signal that is received at a subscriber premises may be on the order of 0-5 dBmV/channel. Such received signal levels may be insufficient to support the various services at an acceptable quality of service level. Accordingly, an RF signal amplifier may be provided at or near an entrance point of an individual subscriber's premises. The RF signal amplifier is used to amplify the downstream RF signals to a more useful level. The RF signal amplifier may also be configured to amplify the upstream RF signals that are transmitted from the subscriber premises to the headend facilities of the cable television network. Typically, the RF signal amplifiers are incorporated into the power divider network as the first unit, which takes the form of a powered bi-directional RF signal amplifier with an input port for receiving a coaxial cable from the service provider side and plural output ports which receive coaxial cables connected to the various service ports, such as the wall outlets that are dispersed throughout the subscriber's premises.

In accordance with the known power divider network unit, a RF signal amplifier receives a composite downstream RF signal of approximately 5 dBmV/channel in the range of approximately 54-1,002 MHz comprising information for telephone, cable television (CATV), Internet, VoIP, and/or data communications from a service provider. The RF signal amplifier may increase this downstream signal to a more useful level of approximately 20 dBmV/channel at each output port of the unit and pass the amplified downstream signal to one or more devices in communication with the RF signal amplifier through connections to the various coaxial wall outlets. Such devices may include, but need not be limited to: televisions, modems, telephones, computers, and/or other communications devices known in the art. In the event of power failure, unamplified signals may still be passed (in both directions) through a passive communications path between the service provider and at least one communications device.

FIG. 1 illustrates a block diagram of a bi-directional RF signal amplifier 100 according to the background art. More information concerning the bi-directional RF signal amplifier 100 can be found in the Assignee's U.S. Pat. No. 9,699,516, granted Jul. 4, 2017, the entire contents of which are herein incorporated by reference.

The RF signal amplifier 100 includes a plurality of RF output ports 181-188 that may be used to pass downstream and upstream signals between a service provider and multiple communications devices located in the subscriber premises when the RF signal amplifier is powered and operating normally. Moreover, RF signal amplifier 100 further includes a non-interruptible RF output port 189 that may be used to maintain bi-directional RF communications even during power outages.

As shown in FIG. 1, RF signal amplifier 100 includes a bi-directional RF input port 105 for receiving downstream RF signals from a service provider, or any other appropriate signal source. RF input port 105 can also pass upstream signals in the reverse direction from the RF signal amplifier 100 to the service provider. Due to the bi-directional nature of communications through RF signal amplifiers, it will be appreciated that an "input" port will act as an "output" port and an "output" port will act as an "input" port if the direction of signal flow is reversed. Consequently, it will be appreciated that the terms "input" and "output" are used herein solely for purposes of distinguishing various ports from one another, and are not used to require a direction of signal flow.

As noted above, RF signal amplifier 100 further includes a plurality of bi-directional output ports 181-189 that may be used to pass downstream RF signals from the RF signal amplifier 100 to one or more devices in communication with the output ports 181-189, and to receive upstream RF signals from those devices so that they may be passed through the RF signal amplifier 100 to the service provider. It will be appreciated that any appropriate device that may advantageously send and/or receive an RF signal may be placed in communication with one or more of the various output ports 181-189. For example, it is contemplated that telephone, CATV, Internet, VoIP, and/or data communication devices may be placed in such communication with a service provider where the RF signal amplifier 100 is installed in the residence of a subscriber. However, it will further be appreciated that any desired combination of these and/or other devices may be used where appropriate.

Signals received through RF input port 105 can be passed through RF signal amplifier 100 via an active communications path 114 that extends between RF input port 105 and RF output ports 181-188 and/or 189. Specifically, the downstream signals that are received at RF input port 105 from the service provider are passed to a passive directional coupler 110 that has a first output port that connects to the active communications path 114 and a second output port that connects to a passive communications path 118. The directional coupler 110 splits downstream RF signals onto the active communications path 114 and the passive communications path 118. It will be appreciated that the directional coupler 110 may either evenly or unevenly split the power of the downstream signals between the communications paths 114, 118, depending on the design of the overall circuit. The active communications path 114 amplifies at least one of downstream signals from the service provider to the subscriber premises or upstream signals from the subscriber premises to the service provider. The passive communications path 118 acts as a "non-interruptible" communications path that has no active components thereon, which allows downstream and/or upstream signals to traverse the passive communications path 118 even if a power supply to the RF signal amplifier 100 is interrupted. In some embodiments, the passive communications path 118 may provide a communications path for VoIP telephone service that will operate even during power outages at the subscriber premises (assuming that the modem and/or telephone, as necessary, are powered by a battery backup unit).

As is further shown in FIG. 1, downstream signals traversing the active communications path 114 pass from the first output of directional coupler 110 to an input port of a switching device such as, for example, an SPDT non-latching relay 120. A first output 122 of the relay 120 is connected to an input of a high/low diplexer 130. A second output 124 of the relay 120 is connected to a resistor 126, such as a 75 ohm resistor connected between the second output 124 and ground.

The diplexer 130 separates the high frequency downstream signal from any low frequency upstream signals incident in the reverse direction. In various embodiments, diplexer 130 can filter the signals in a manner such that signals with frequencies greater than approximately 45-50 MHz are passed as high frequency downstream signals, while signals with frequencies lower than such range are passed in the reverse direction as low frequency upstream signals received from ports 181-188. It will be appreciated, however, that other diplexer designs may be utilized.

The high frequency downstream signals filtered by diplexer 130 can be amplified by individual power amplifier 140, and passed through a second high/low diplexer 150 to a MoCA rejection filter 160. MoCA rejection filter 160 attenuates any frequencies in the MoCA frequency range. Typically, no signals in the downstream direction will contain MoCA frequencies and hence the downstream signal will be unaffected.

Next, the downstream signal passes to an input 169 of a power divider network 170. The power divider network 170 splits the downstream signal so that it may be distributed to each of ports 181-188. In the embodiment of FIG. 1, the power divider network 170 includes a power divider 171 in a first tier, feeding power dividers 172 and 173 in a second tier, feeding power dividers 174, 175, 176 and 177 in a third tier. The first, second and third tiers form a pyramid or tree structure. While the power divider network 170 illustrated in FIG. 1 splits the downstream signals for distribution to eight different ports, it will be appreciated that the power divider network 170 may split the downstream signals for distribution to different numbers of ports (e.g., four, six, ten, etc.).

Turning now to the reverse (upstream) signal flow through the active communications path 114 of RF signal amplifier 100, upstream signals received by the RF signal amplifier 100 from devices in communication with RF output ports 181-188 are passed to power divider network 170 where they are combined into a composite upstream signal. This composite upstream signal is fed out of input 169 through the MoCA rejection filter 160. The MoCA rejection filter 160 attenuates frequencies in the MoCA frequency range so as to prevent the MoCA signaling, which freely traverses between the ports 181-188, from entering the high/low diplexer 150. The high/low diplexer 150 separates the low frequency composite upstream signal from any high frequency downstream signals incident in the forward direction. As previously discussed in relation to diplexer 130, the diplexer 150 can filter the signals such that signals with frequencies greater than approximately 45-50 MHz are passed in the forward direction as high frequency downstream signals, while signals with frequencies lower than such range are passed in the reverse direction as low frequency upstream signals received from ports 181-188.

The composite low frequency upstream signal filtered by diplexer 150 can be passed directly to high/low diplexer 130 (or optionally the upstream signal filtered by the diplexer 150 can pass through an upstream power amplifier 142 prior to reaching the diplexer 130), where it is then passed through the first output port 122 of the non-latching SPDT relay 120 to the first output port of the directional coupler 110. The directional coupler 110 combines the upstream signal received at output port 122 with any upstream signal received from the passive communications path 118 and passes this combined signal to the RF input port 105 for output to a service provider or other entity in communication with RF input port 105.

The power amplifiers 140 and 142 that are included on the active communications path 114 are active devices that must be powered via a power source, such as a DC linear regulator 195 that outputs a power supply voltage VCC. During normal operation, the RF signal amplifier 100 can be powered from a power input port 190 and/or power that is reverse fed through one of the RF output ports (e.g., output port 188, which is labeled "VDC IN"). In a typical installation at a subscriber premises, it is contemplated that RF signal amplifier 100 may be powered by an AC/DC adapter receiving power provided by the residence (for example, 100-230 oVAC, 50/60 Hz). As illustrated in FIG. 1, the power received from either power input 190 or power input 188 may be provided to the DC voltage regulator 195 which supplies an operating voltage VCC to the power amplifiers 140 and 142.

In the event that power to the DC voltage regulator 195 is interrupted, DC voltage regulator 195 will be unable to provide operating voltage VCC to power amplifiers 140 and 142. Consequently, during power outages, the downstream portion (and also the upstream portion, if the upstream power amplifier 142 is employed) of the active communications path 114 will be lost.

As noted above, RF signal amplifier 100 also has the passive communications path 118 that extends from the second output of the directional coupler 120 to the port 189. This passive communication path 118 bypasses the power amplifiers 140 and 142 and does not include any active components. Consequently, the passive communications path 118 will remain available to pass communications between RF input port 105 and port 189, even when the power supply to RF signal amplifier 100 is interrupted. Accordingly, the passive communications path 118 is also referred to as a "non-interruptible" communications path. The passive communications path 118 may be used to maintain essential services to the subscriber premises such as, for example, 911 emergency lifeline services, even during power outages, so long as the subscriber has a battery backup for the necessary devices connected to port 189.

The passive communications path 118 is connected to the active communications path 114 at the input 169 of the power divider network 170. Within the passive communication path 118, upstream signals from the port 189 pass into a common input 168 of a diplexer 162. Signals in the MoCA frequency range exit the diplexer 162 via output 164 and pass to the active communication path 114 directly upstream of the power divider network 170. By this arrangement, MoCA signals from the port 189 may enter the input 169 of the power divider network 170. Hence, MoCA signals may be passed between all of the devices connected to ports 181-189.

The signals from the port 189 which pass into the input 168 of the diplexer 162, which are in the high/low frequency range for downstream and upstream communication with the service provider exit the diplexer 162 via output 166 and pass to the second output of the directional coupler 110, where the signals are combined with the signals on the active communication path 114 and are then passed to the RF input port 105.

FIG. 2 is a top view of an outer housing 101 of an RF signal amplifier 100 constructed in accordance with FIG. 1. FIG. 2 shows the placement of the various input, output and power ports 105, 181-189 and 190, each having a female coaxial configuration. FIG. 2 also shows the AC/DC power adapter 99 for connection to the power input port 190, and a coaxial cable or signal line 20 from the service provider or head end. FIG. 2 also shows mounting holes 97 and a ground wire terminal 95.

Additional background art showing various circuits and configurations for an RF signal amplifier can be found in U.S. Pat. Nos. 3,676,744; 6,969,278; 7,530,091; 8,695,055; 8,752,114; 8,810,334; 9,209,774; 9,356,796 and 9,743,038, and in US Published Applications 2005/0044573; 2006/0205442 and 2013/0081096 and, which are herein incorporated by reference.

Many large houses or business complexes, hereinafter referred to as large structures, may have more than nine coaxial wall outlets, which need an ability to communicate with a customer device. If a large structure has more than nine coaxial wall outlets in use, it is sometimes possible to use one or more splitters downstream of the RF signal amplifier 100 to send/receive signals to the additional wall outlets. For example, a first splitter may be employed downstream of the RF output port 181 and the RF output port 183, so that the RF signal amplifier 100 can communicate with eleven coaxial wall outlets.

However, placing a splitter downstream of one of the RF output ports, e.g., RF output port 181, splits the power level of the downstream signal by at least 50%, assuming no loss within the splitter circuitry. Therefore, splitters are not an optimal solution, as the signal power level becomes too low to provide a good signal to the customer device attached to the coaxial wall outlet, and quality of service (QoS) issues may develop.

One solution known in the art is to provide two or more RF signal amplifiers 100 to send communication signals to the numerous coaxial wall outlets of the large structure. FIG. 3 shows a typical solution, in accordance with the background art, for providing a communication link between the headend and the customer devices within a large structure having more than nine coaxial outlets and less than eighteen coaxial outlets.

In FIG. 3, the signal line 20 from the headend 10 enters an input 30 of a splitter 40. Slightly less than fifty percent of the signal power from the headend 10 is directed toward first splitter output 50 and slightly less than fifty percent of the signal power from the headend 10 is also directed toward second splitter output 60. The first splitter output 50 is connected to a first RF input port 105 of a first RF signal amplifier 100 and the second splitter output 60 is connected to a second RF input port 105A of a second RF signal amplifier 100A.

The first RF signal amplifier 100 boosts its 50% portion of the downstream signal up to a level sufficient to communicate with the eight RF output ports 181-188 associated with the first RF signal amplifier 100. The second RF signal amplifier 100A boosts its 50% portion of the downstream signal up to a level sufficient to communicate with the eight RF output ports 181-188 associated with the second RF signal amplifier 100A. If more than sixteen amplified coaxial wall outlets (and two passive wall outlets) are present in the large structure, the signal line 20 may be split three ways by a three way splitter to power three RF signal amplifiers 100, 100A, 100B.

SUMMARY OF THE INVENTION

The Applicant has appreciated some drawbacks in the RF signal amplifier 100 of FIGS. 1-3. With the configuration of FIG. 3, a first set of subscriber devices connected to the first RF signal amplifier 100 can communicate with each other using MoCA signaling, and a second set of subscriber devices connected to the second RF signal amplifier 100A can communicate with each other using MoCA signaling. However, subscriber devices in the first set cannot communicate with subscriber devices in the second set using MoCA signaling and vice versa.

The reason that the MoCA signaling is not allowed between the two sets of subscriber devices is because of the MoCA rejection filter 160 in each of the RF signal amplifiers 100 and 100A. The connection between the first and second RF signal amplifiers 100 and 100A is upstream from the MoCA rejection filters 160 (actually just upstream of the RF input ports 105 and 105A), and hence MoCA signals can't flow between the first and second RF signal amplifiers 100 and 100A.

Removal of the MoCA rejection filter 160 is not a good option, as typically it is desired that MoCA signaling should not travel upstream of the RF input port 105. When MoCA signals are permitted pass upstream of the RF input port 105, the MoCA signals may pass into the service provider line 20 and MoCA communications between the subscriber's device and another unrelated subscriber's device can occur. Such a situation can lead to interference issues with the other subscribers and raise privacy issues, as an unrelated subscriber could view and/or change data on another subscriber's devices, e.g., view call logs, or view, erase or record programming on a DVR. Further, MoCA signaling, although located at higher frequencies than the CATV signals, can potentially interfere with the CATV signals, when lower order harmonics are present in the MoCA signals. Harmonics can be caused by a number of factors, such as signal reflections at connection terminals and equipment terminals, and by elements within the MoCA signal generating equipment. Therefore, many CATV network companies require the RF signal amplifier 100 to block MoCA signals from exiting the RF input port 105.

It is an object of the present invention to address the drawbacks discussed above.

These and other objects of the invention are accomplished by a bi-directional RF signal amplifier including a housing; an RF input port on an exterior of the housing; a power divider network having a plurality of active RF output ports on the exterior of said housing; an active communications path within the housing connecting the RF input port to the power divider network, the active communications path including at least one power amplifier to amplify an upstream signal or a downstream signal passing along the active communications path; a passive RF output port on the exterior of the housing; a passive communications path within the housing connecting the RF input port to the passive RF output port, wherein the passive communications path has no power amplifier; a MoCA only input/output port on the exterior of the housing; and a MoCA signal path within the housing connecting the power divider network to the MoCA only input/output port.

Further, these and other objects of the invention are accomplished by a passive splitter including a housing; an RF input port on an exterior of the housing; a power divider network having a plurality of CATV/MoCA RF output ports on the exterior of the housing, wherein the power divider network includes a plurality of connected power dividers; a CATV communications path within the housing connecting the RF input port to the power divider network; a MoCA input/output port on the exterior of the housing; a MoCA signal path within the housing connecting the power divider network to the MoCA input/output port; and a MoCA pass filter within the housing and located along the MoCA signal path, the MoCA pass filter having a first node connected to the power divider network and a second node connected to the MoCA input/output port.

Moreover, these and other objects of the invention are accomplished by a method of installing a communication system within a premises including installing a first bi-directional RF signal amplifier including a first RF input port and a first MoCA input/output port in a premises; installing a second bi-directional RF signal amplifier including a second RF input port and a second MoCA input/output port in the same premises; attaching an RF signal feed from a service provider to the first and second RF input ports of the first and second bi-directional RF signal amplifiers; and attaching a communication link between the first and second MoCA input/output ports of the first and second RF signal amplifiers.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limits of the present invention, and wherein.

DETAILED DESCRIPTION OF EMBODIMENTS OF THE INVENTION

Figure 1:
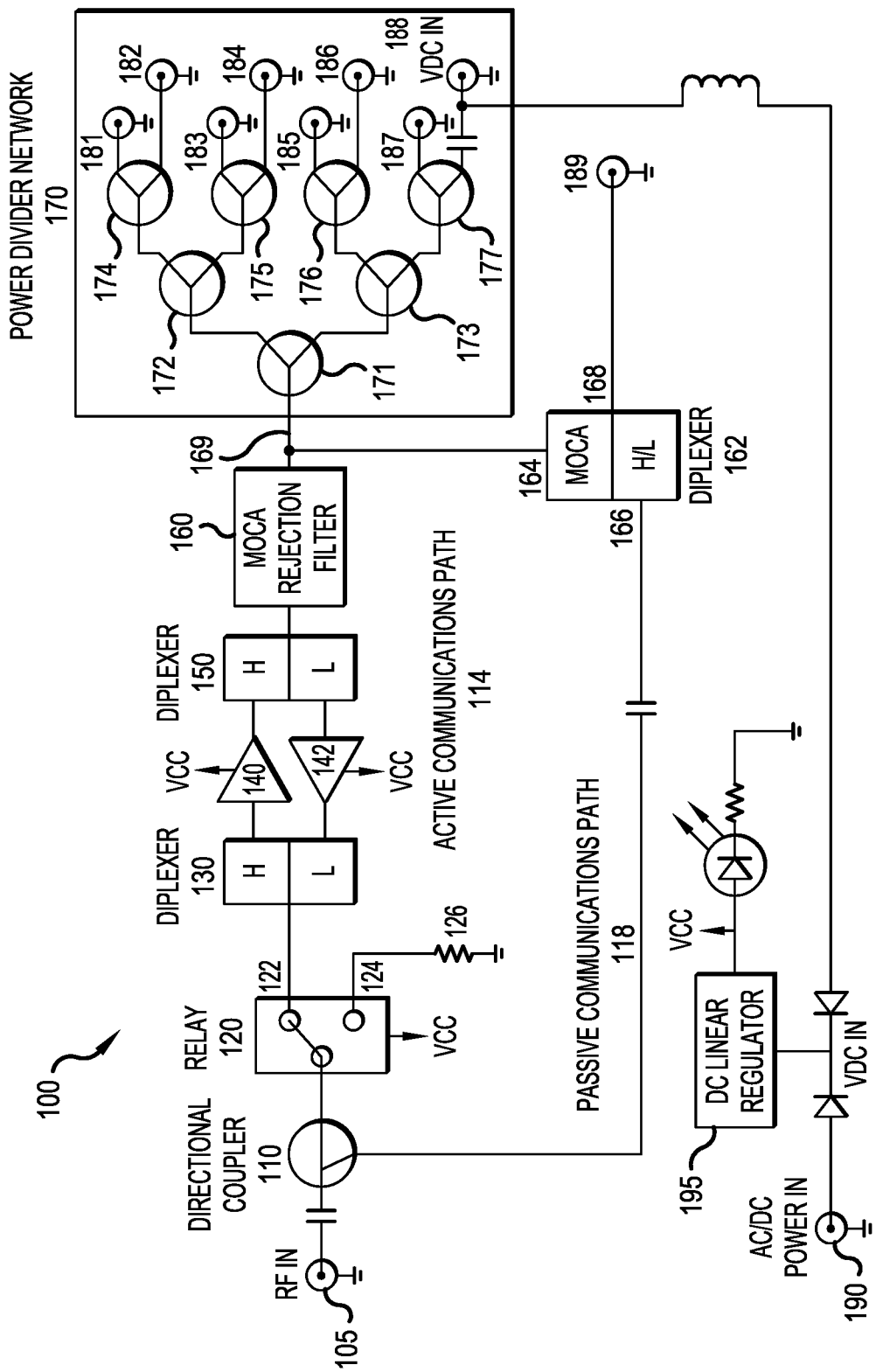
FIG. 1 is a block diagram of a bi-directional RF signal amplifier, according to the background art.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Figure 2:
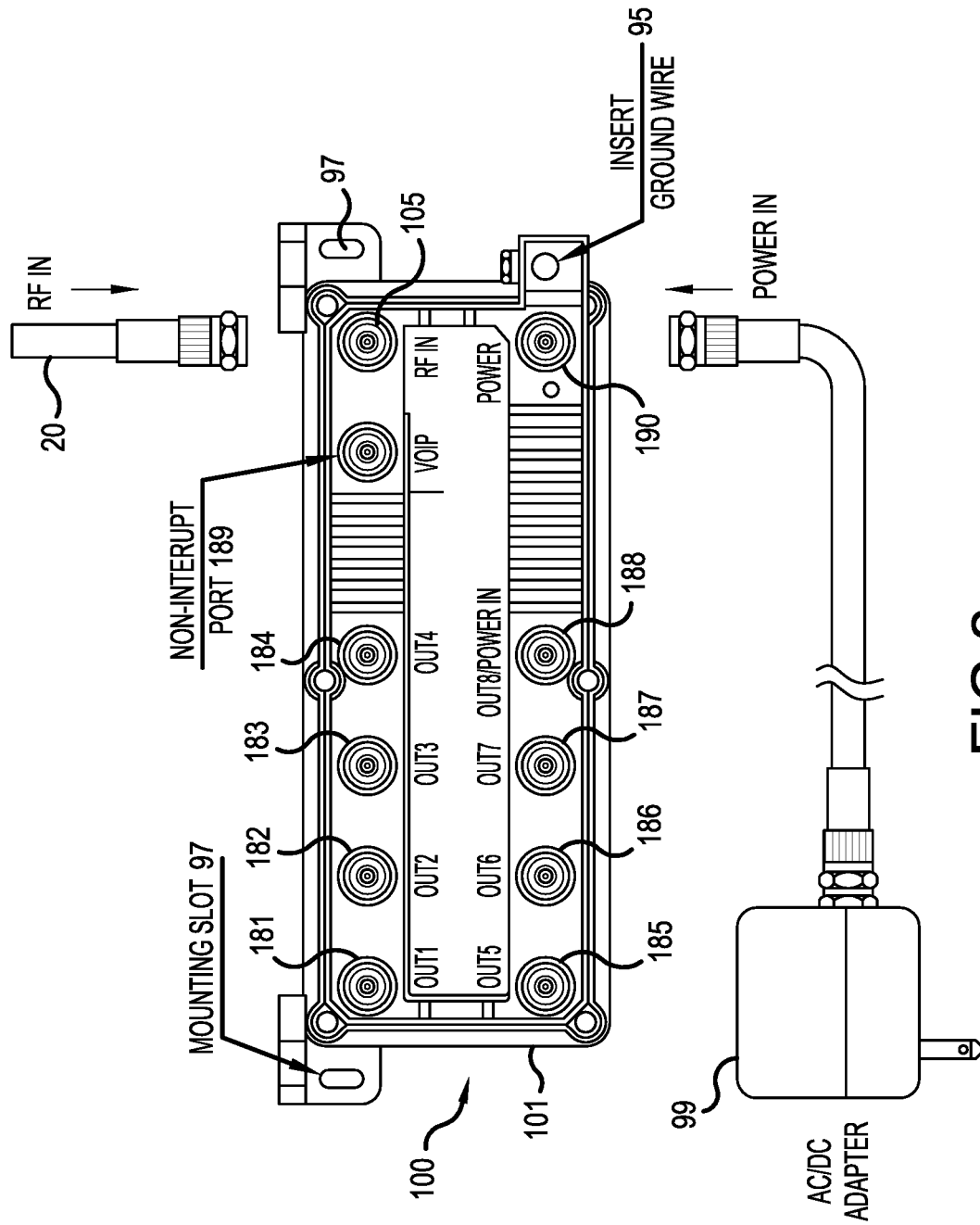
FIG. 2 is a top view of a housing of the bi-directional RF signal amplifier of FIG. 1.
Figure 3:
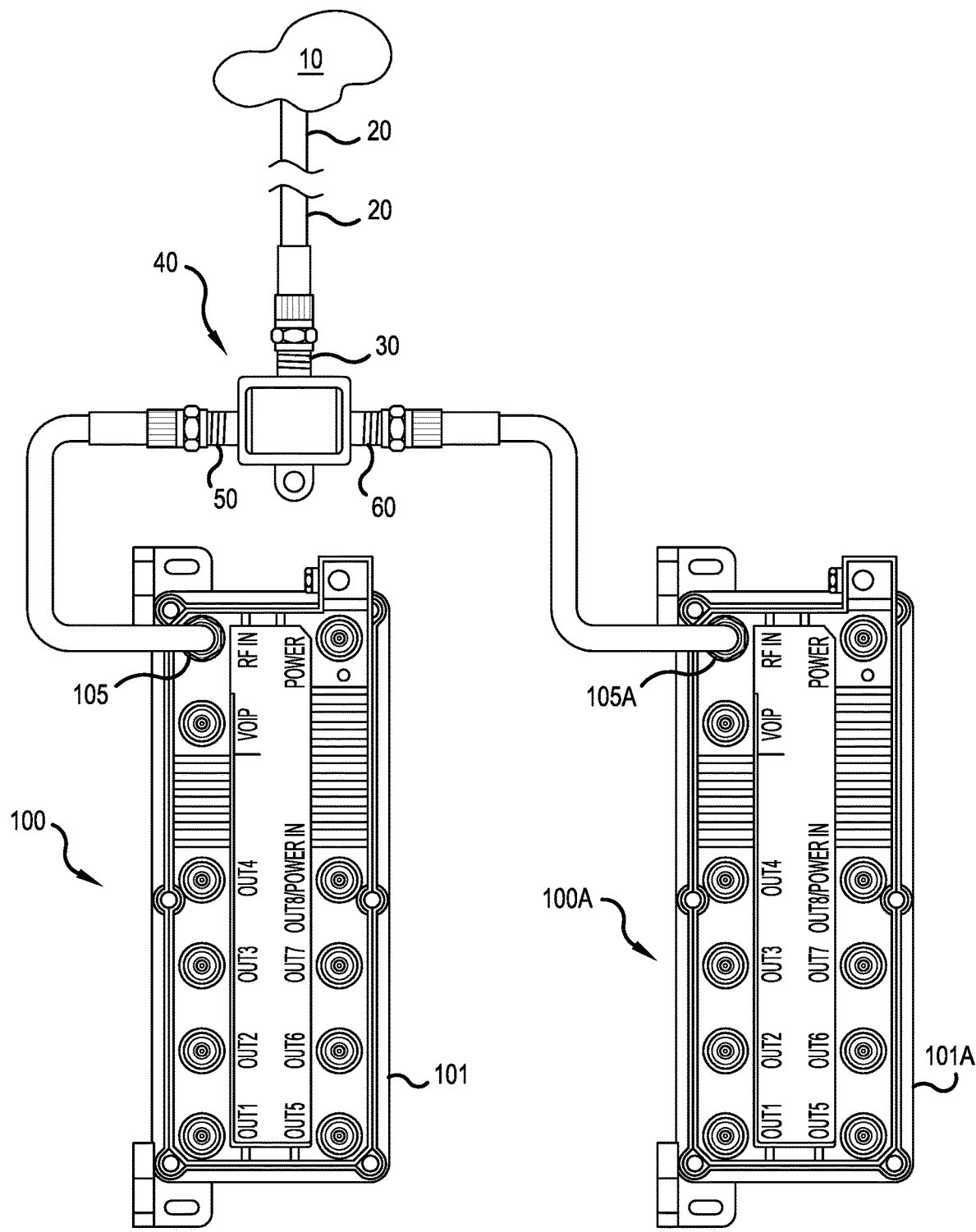
FIG. 3 is a top view of two bi-directional RF signal amplifiers of FIG. 2 having their RF input ports attached to outputs of a splitter.
Figure 4:
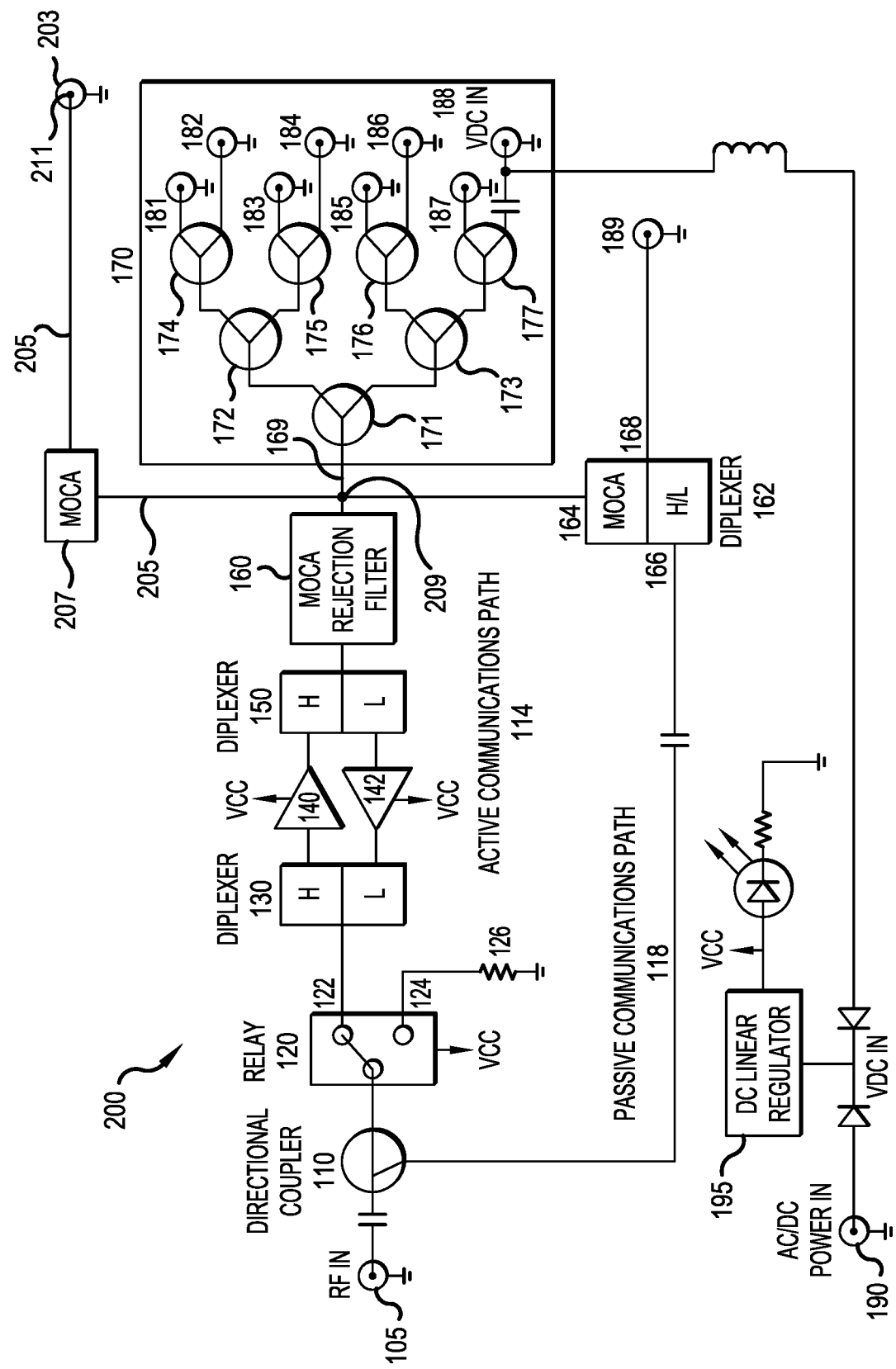
FIG. 4 is a block diagram of a bi-directional RF signal amplifier, according to the present invention.

FIG. 4 is a block diagram of a bi-directional RF signal amplifier 200, according to the present invention. Components which are the same as the components as shown in the background art of FIG. 1 have been labeled with the same reference numerals. The bi-directional RF signal amplifier 200 includes an outer housing 201 (best seen in FIG. 9). The housing 201 is the same as the housing 101 of FIG. 2, except for the presence of an additional port, namely a MoCA only input/output port 203.

With reference to FIG. 4, the bi-directional RF signal amplifier 200 has an RF input port 105 on an exterior of the housing 201. A power divider network 170 includes a plurality of active RF output ports 181, 182, 183, 184, 185, 186, 187 and 188 on the exterior of the housing 201. An active communications path 114 within the housing 201 connects the RF input port 105 to the power divider network 170. The active communications path 114 includes at least one power amplifier 140 and/or 142 to amplify an upstream signal or a downstream signal passing along the active communications path 114.

A passive RF output port 189 is provided on the exterior of the housing 201. A passive communications path 118 within the housing 201 connects the RF input port 105 to the passive RF output port 189. The passive communications path 118 has no power amplifier.

The active communications path 114 includes a first diplexer 130 having a common port, a high frequency port and a low frequency port. The common port of the first diplexer 130 is coupled to the RF input port 105. The high frequency port of the first diplexer 130 is coupled to a first power amplifier 140. A second diplexer 150 has a common port, a high frequency port and a low frequency port. The high frequency port of the second diplexer 150 is coupled to the first power amplifier 140. The common port of the second diplexer 150 is coupled to the power divider network 170.

A directional coupler 110 is interposed between the RF input port 105 and the first diplexer 130. An input of the directional coupler 110 is coupled to the RF input port 105. A first output of the directional coupler 110 is coupled to the common port of the first diplexer 130, and a second output of the directional coupler 110 is coupled to the passive communications path 118 leading to the passive RF output port 189.

The MoCA only input/output port 203 is also provided on the exterior of the housing 201. A MoCA signal path 205 within the housing 201 connects the power divider network 170 to the MoCA only input/output port 203. A MoCA pass filter 207 is located within the housing 201 and located along the MoCA signal path 205. The MoCA pass filter 207 has a first node 209 connected to the input 169 of the power divider network 170 and a second node 211 connected to the MoCA only input/output port 203.

Figure 9:
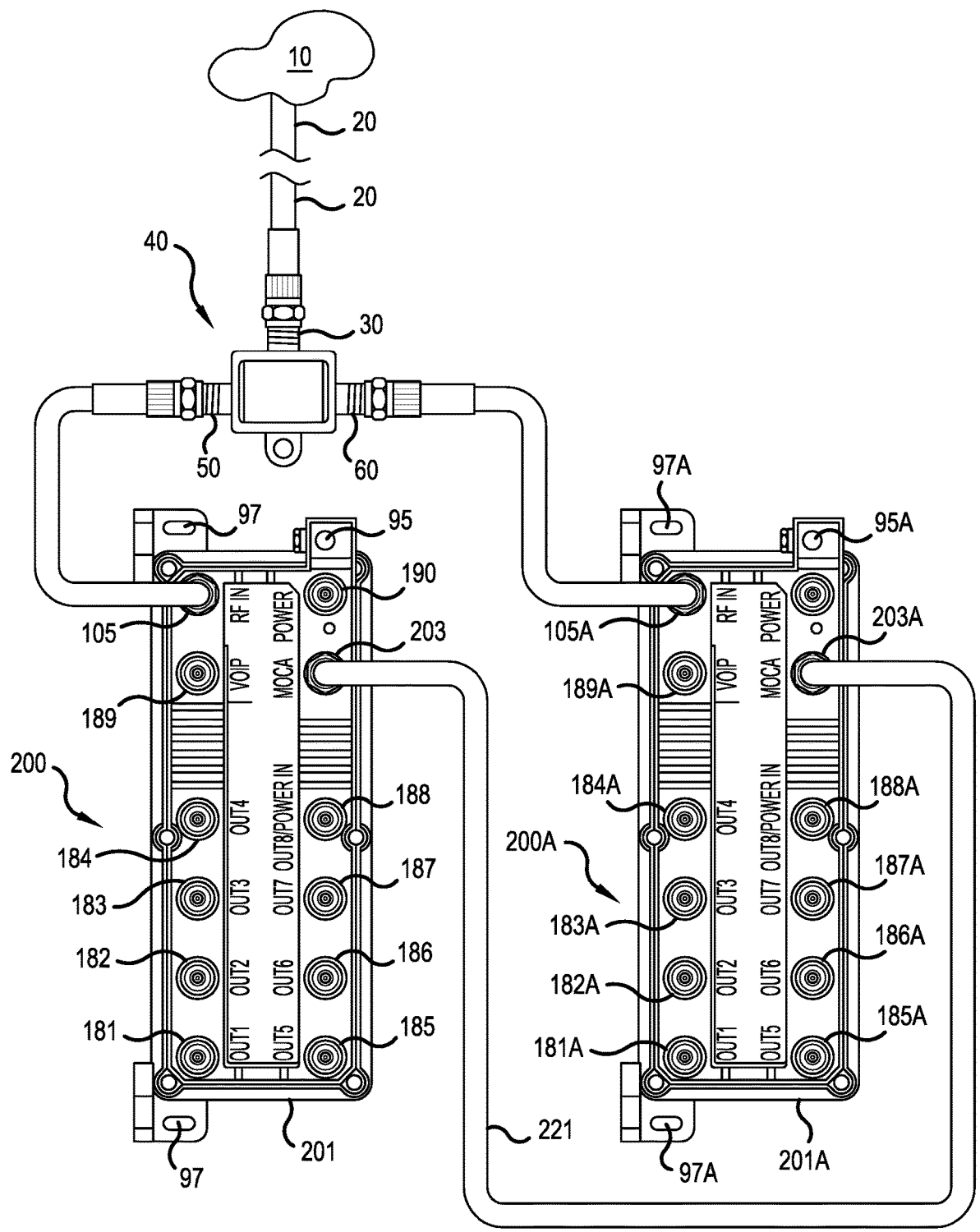
FIG. 9 is a top view showing two bi-directional RF signal amplifiers, of FIG. 4 or 6, connected to each other.

In FIG. 9, the MoCA only input/output port 203 is configured as a female coaxial port. In fact all of the ports of the housing 201 are configured as female coaxial ports. However, some or all of the ports need not be configured as female coaxial ports. For example, the MoCA only input/output port 203 could be configured as a socket to accept two electrical lead pins of a jumper cable. Also, the power port 190 could be configured to accept a barrel-style connector, commonly associated with an AC/DC power adapter.

In FIG. 4, the first node 209 is connected directly upstream of the power divider network 170, e.g., between the power divider network 170 and the MoCA rejection filter 160 of the active communications path 114. However, this is not the only location where the first node 209 may be connected.

Figure 5:
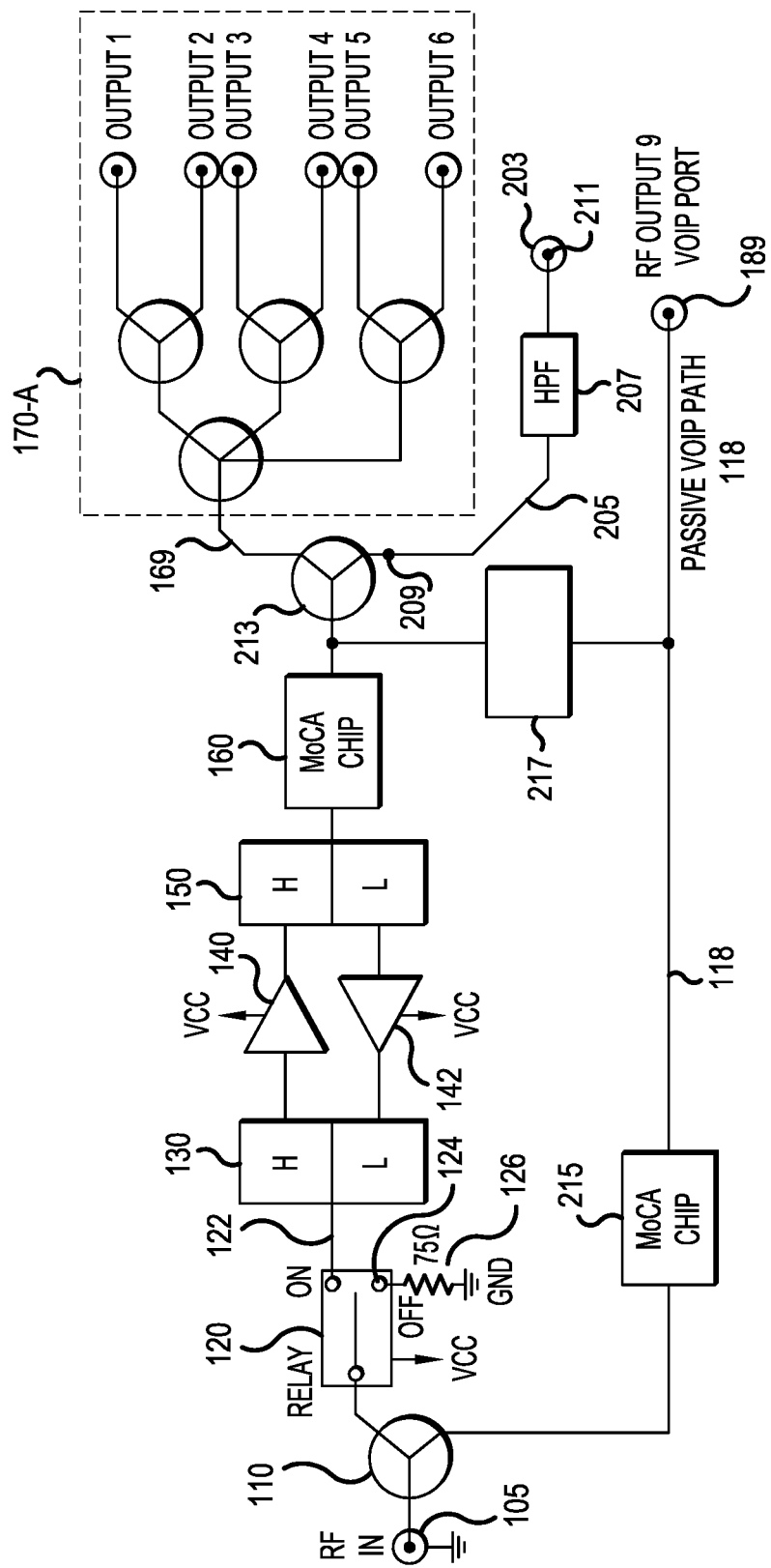
FIG. 5 is a block diagram of a first alternative embodiment of a bi-directional RF signal amplifier, according to the present invention.

FIG. 5 shows an alternative embodiment of the present invention. In FIG. 5, a power divider 213 is installed between the MoCA rejection filter 160 and the input 169 to the power divider network 170-A. The input to the power divider 213 is connected to the MoCA rejection filter 160. A first output of the power divider 213 is connected to the input 169 of the power divider network 170-A. A second output of the power divider 213 is connected to the first node 209 of the MoCA pass filter 207. MoCA signals exiting from the power divider network 170-A are permitted to pass between the first and second outputs of the power divider 213, as the power divider 213 may include a MoCA bypass circuit (like the bypass circuit 230, shown in the Assignee's U.S. Pat. No. 8,397,271, which is herein incorporated by reference). Further, the MoCA rejection filter 160 may be configured to reflect MoCA signals back to the power divider 213, so that the MoCA signals pass freely back through the second leg to the MoCA pass filter 207.

FIG. 5 also illustrates that the power divider network 170-A may include more or fewer than eight RF output ports, and the power divider network 170-A may include three-way power dividers instead of, or in addition to, two-way power dividers. FIG. 5 also shows that the diplexer 162, shown along the passive communications path 118 in FIG. 1, may be replaced with two individual filters. Namely, a MoCA rejection filter 215 prevents MoCA signals on the passive communication path 118 from passing to the RF input port 105 (while allowing CATV upstream and downstream signals to pass between the RF input port 105 and the passive communication path 118). Also, a MoCA pass filter 217 passes MoCA signals between the power divider network 170-A and the passive communication path 118 (but prevents CATV upstream and downstream signals from passing between the active communication path 114 and the passive communication path 118).

Figure 6:
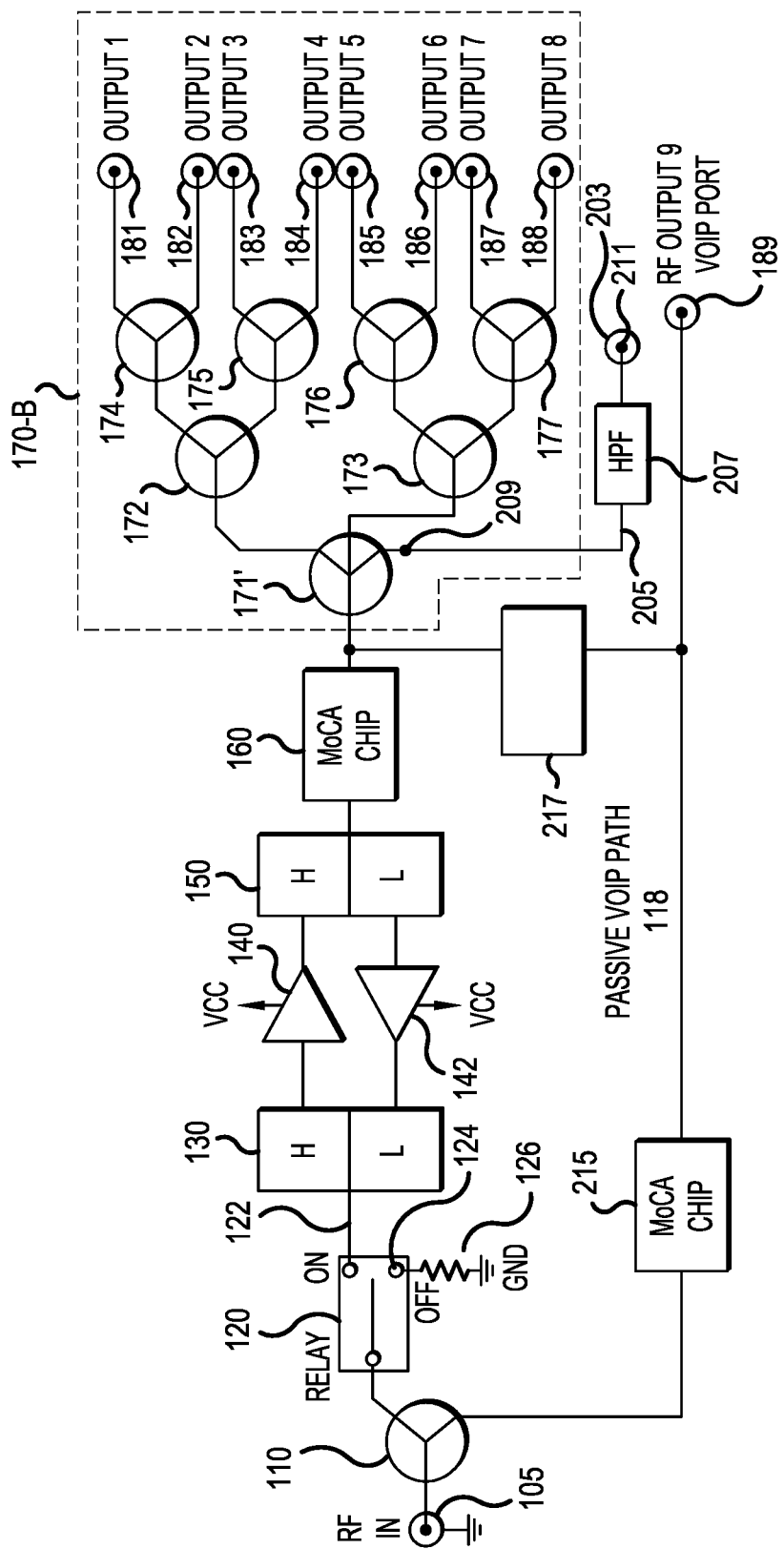
FIG. 6 is a block diagram of a second alternative embodiment of a bi-directional RF signal amplifier, according to the present invention.

FIG. 6 illustrates that the first node 209 of the MoCA pass filter 207 may be connected to a location within the power divider network 170-B. The power divider network 170-B is almost identical to the power divider network 170 of FIG. 1, except that the first power divider 171 (a two-way power divider having an input directly connected to the input 169 of the power divider network 170) has been replaced by a three-way power divider 171'. The new third output of the first power divider 171' is connected to the first node 209 of the MoCA pass filter 207.

Figure 7:
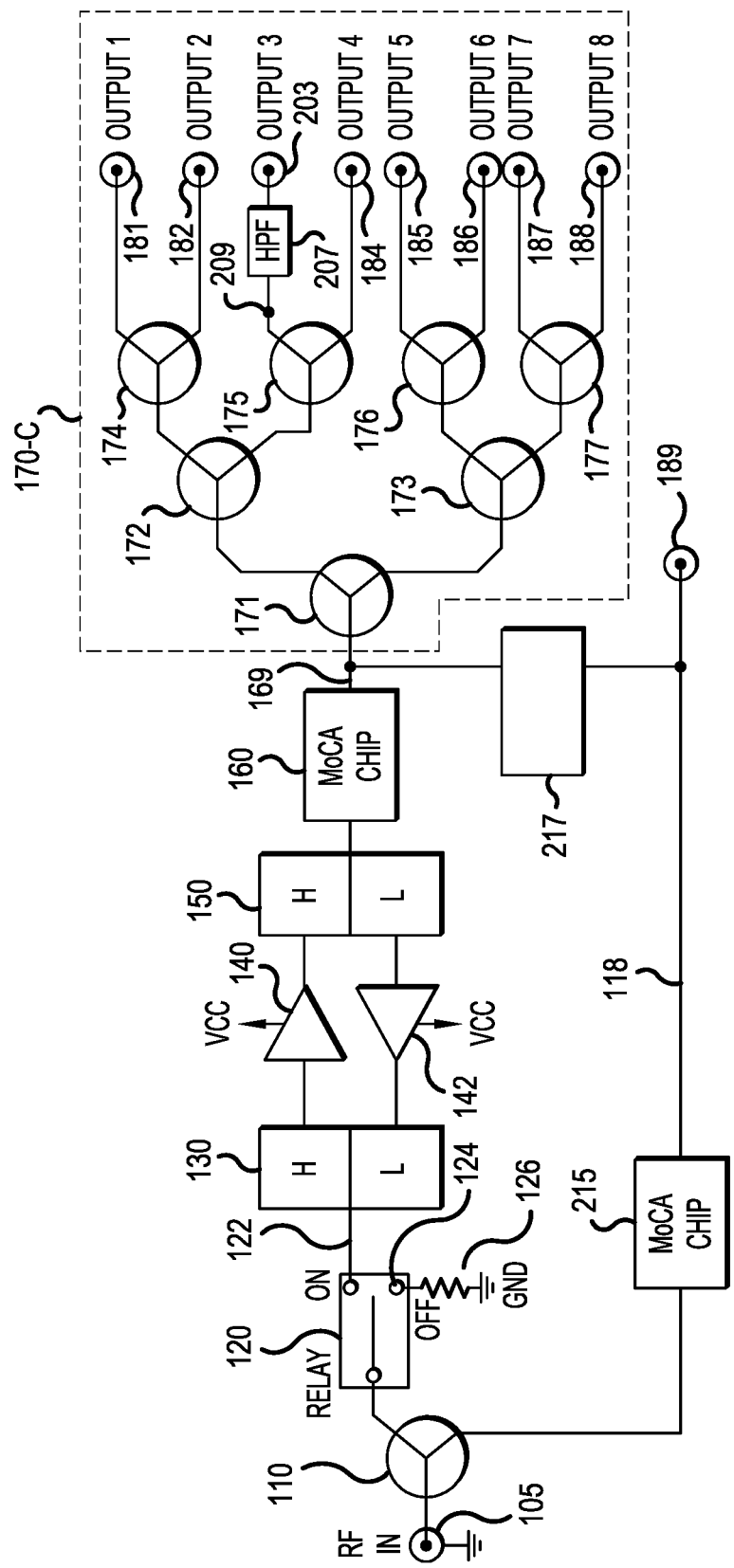
FIG. 7 is a block diagram of a third alternative embodiment of a bi-directional RF signal amplifier, according to the present invention.

FIG. 7 shows yet another embodiment wherein the first node 209 of the MoCA pass filter 207 is connected to a location within the power divider network 170-C. The divider network 170-C is almost identical to the power divider network 170 of FIG. 1, except that the RF output port 183 does not exist. Instead, the Node 209 has been connected to an output leg of the fifth power divider 175, so that the MoCA only input/output port 203 replaces the RF output port 183. Of course, the first node 209 could have been connected to any of the output legs of the fourth through seventh power dividers 174-177.

Figure 8:
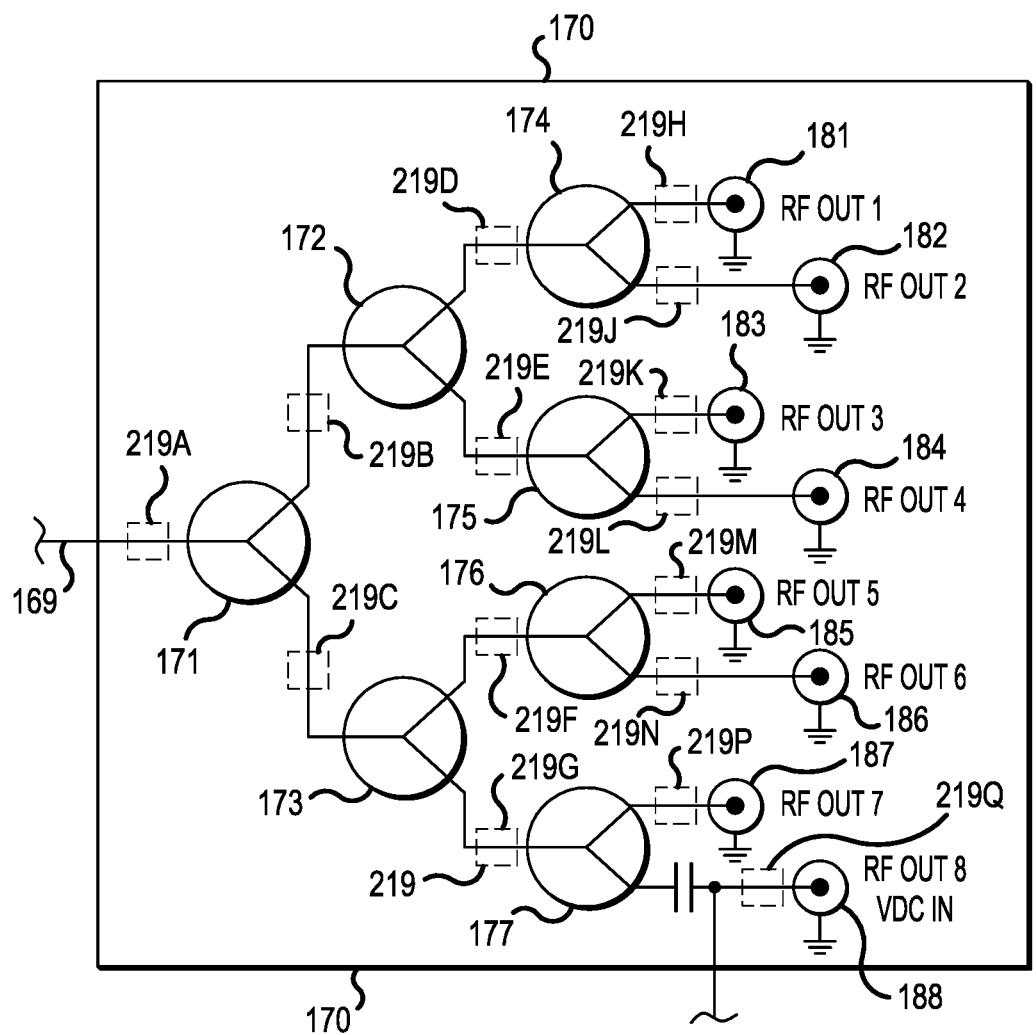
FIG. 8 is a close-up view of a power divider network, showing various connection locations for a MoCA pass filter.

FIG. 8 is a close-up view of the power divider network 170 of FIG. 4. Dashed boxes 219 indicate other potential connection locations for the first node 209 of the MoCA pass filter 207. In other words, the first node 209 may be attached to a location within the power divider network 170, wherein the location is between an output of a first power divider and an input of a second power divider, e.g., locations 219B, 219C, 219D, 219E, 219F and 219G. The first node 209 may be attached to a location within the power divider network, wherein the location is only before an input to a power divider, e.g., location 219A. Further, the first node 209 may be attached to a location within the power divider network, wherein the location is only after an output of a power divider, e.g., locations 219H, 219J, 219K, 219L, 219M, 219N, 219P and 219Q.

FIG. 9 shows the configuration wherein the bi-directional RF signal amplifier 200 of FIG. 4 is connected to an identical bi-directional RF signal amplifier 200A. A signal line 20 from the headend 10 enters an input 30 of a splitter 40. Slightly less than fifty percent of the signal power from the headend 10 is directed toward first splitter output 50 and slightly less than fifty percent of the signal power from the headend 10 is also directed toward second splitter output 60. The first splitter output 50 is connected to a first RF input port 105 of a first RF signal amplifier 200 and the second splitter output 60 is connected to a second RF input port 105A of a second RF signal amplifier 200A.

The first RF signal amplifier 200 boosts its 50% portion of the downstream signal up to a level sufficient to communicate with the eight RF output port 181-188 associated with the first RF signal amplifier 200. The second RF signal amplifier 200A boosts its 50% portion of the downstream signal up to a level sufficient to communicate with the eight RF output port 181A-188A associated with the second RF signal amplifier 200A.

A connection link 221 extends between the first MOCA only input/output port 203 and the second MOCA only input/output port 203A. As illustrated in FIG. 9, the connection link 221 is a coaxial cable, however other types of wired links may be used to establish the connection, such as a twisted pair cable. Further, the connection link may be established by a wireless manner, such as a Bluetooth or WiFi connection. By the arrangement of FIG. 9, MoCA signals of the ports 181-189 of the first RF signal amplifier 200 may be communicated back and forth with the ports 181A-189A of the second RF signal amplifier 200A.

Figure 10:
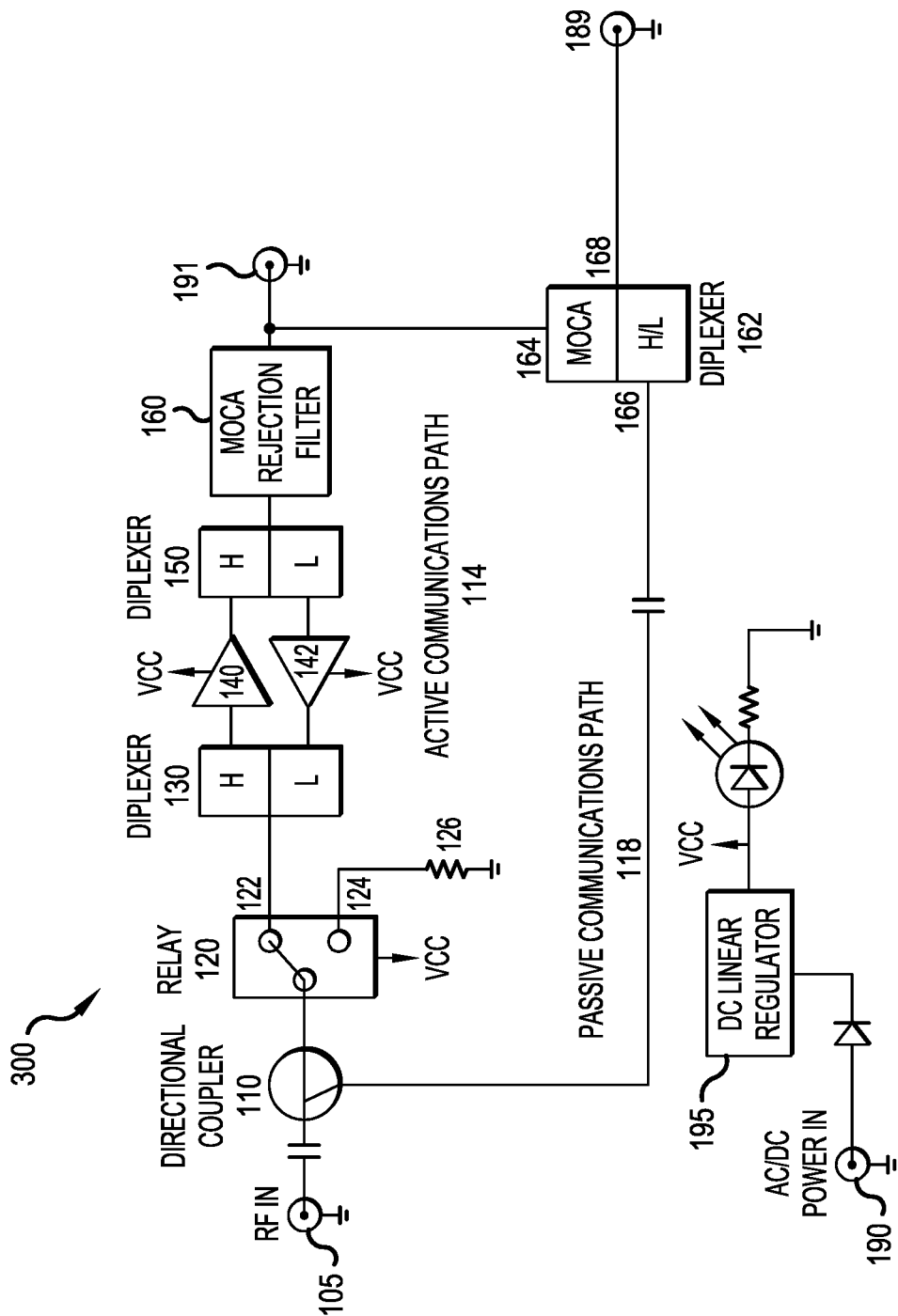
FIG. 10 is a block diagram of a bi-directional RF signal amplifier with no power divider network.

FIG. 10 shows a modified bi-directional RF signal amplifier 300. The modified bi-directional RF signal amplifier 300 is the same as the bi-directional RF signal amplifier 100 (FIG. 1) except for a few modifications. The power divider network 170 and its associated RF output ports 181-188 are eliminated, including the electrical connection from the RF output port 188 to the DC linear regulator 195. The elements of the RF signal amplifier 100 are maintained up to the point of the input 169 of the power divider network 170, but the input 169 is converted into a coaxial output port 191 accessible on the outside of a housing 301 (See FIGS. 11 and 12) of the modified RF bi-directional RF signal amplifier 300. The modified bi-directional RF signal amplifier 300 is connected to one or more passive splitter units, formed as separately housed units.

Figure 11:
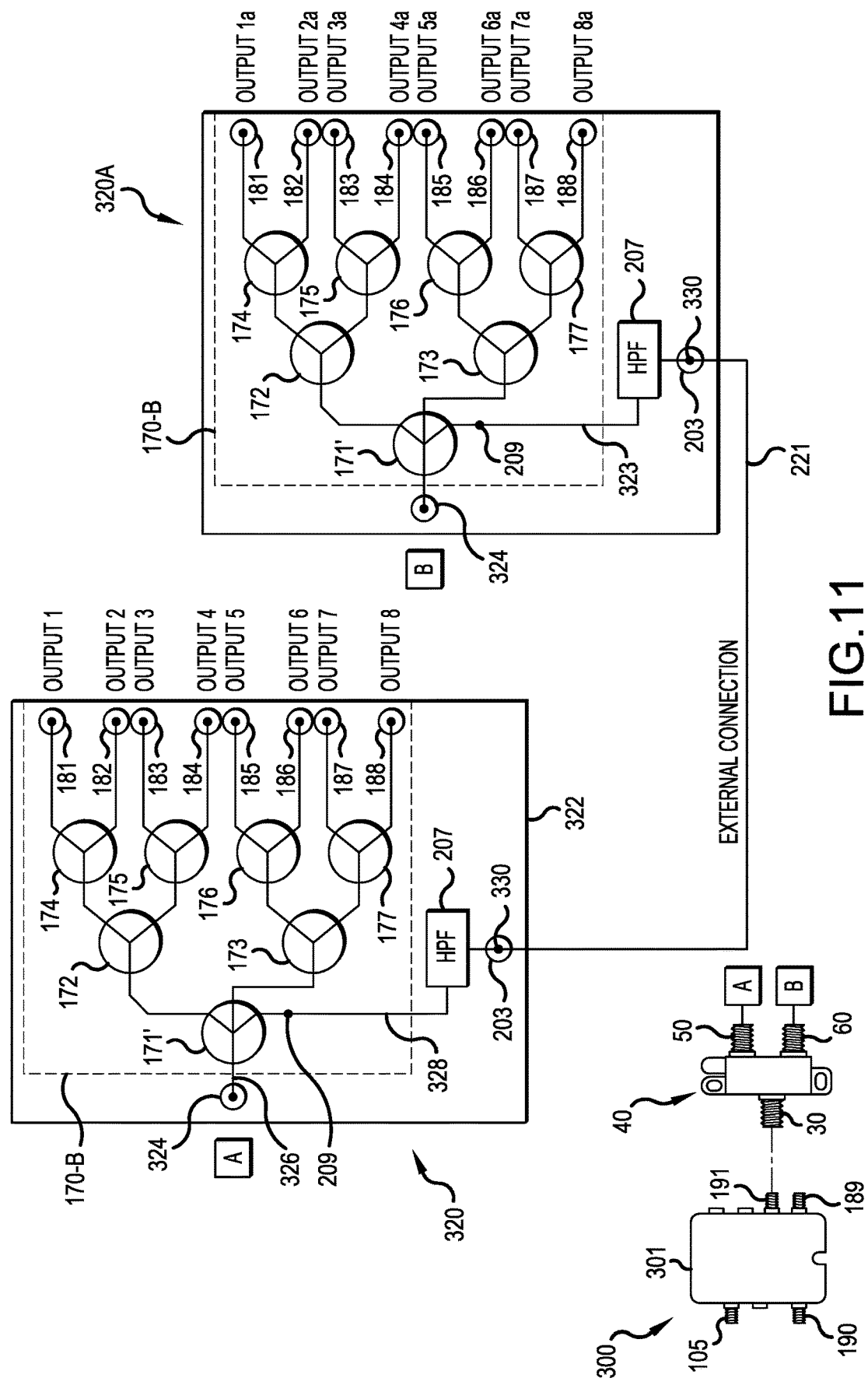
FIG. 11 is a block diagram of two passive splitters connected to the bi-directional RF signal amplifier of FIG. 10, and to each other for allowing MoCA signaling between the RF output ports.

For example, FIG. 11 shows a first passive splitter 320 including a housing 322. An RF input port 324 is formed on an exterior of the housing 322. A power divider network 170-B includes a plurality of CATV/MoCA RF output ports 181-188 on the exterior of the housing 322. The power divider network 170-B includes the same tree-type array of plural connected power dividers 171', 172, 173, 174, 175, 176 and 177, as shown in FIG. 6. A CATV or service provider communications path 326 is located within the housing 322 and connects the RF input port 324 to the power divider network 170-B.

A MoCA only input/output port 203 is located on the exterior of the housing 322. A MoCA signal path 328 within the housing 322 connects the power divider network 170-B to the MoCA only input/output port 203. A MoCA pass filter 207 is placed within the housing 322 and located along the MoCA signal path 328. The MoCA pass filter 207 has a first node 209 connected to the power divider network 170-B and a second node 330 connected to the MoCA only input/output port 203. In FIG. 11, the first node 209 is connected to an additional or third output of the first power divider 171'.

Figure 12:
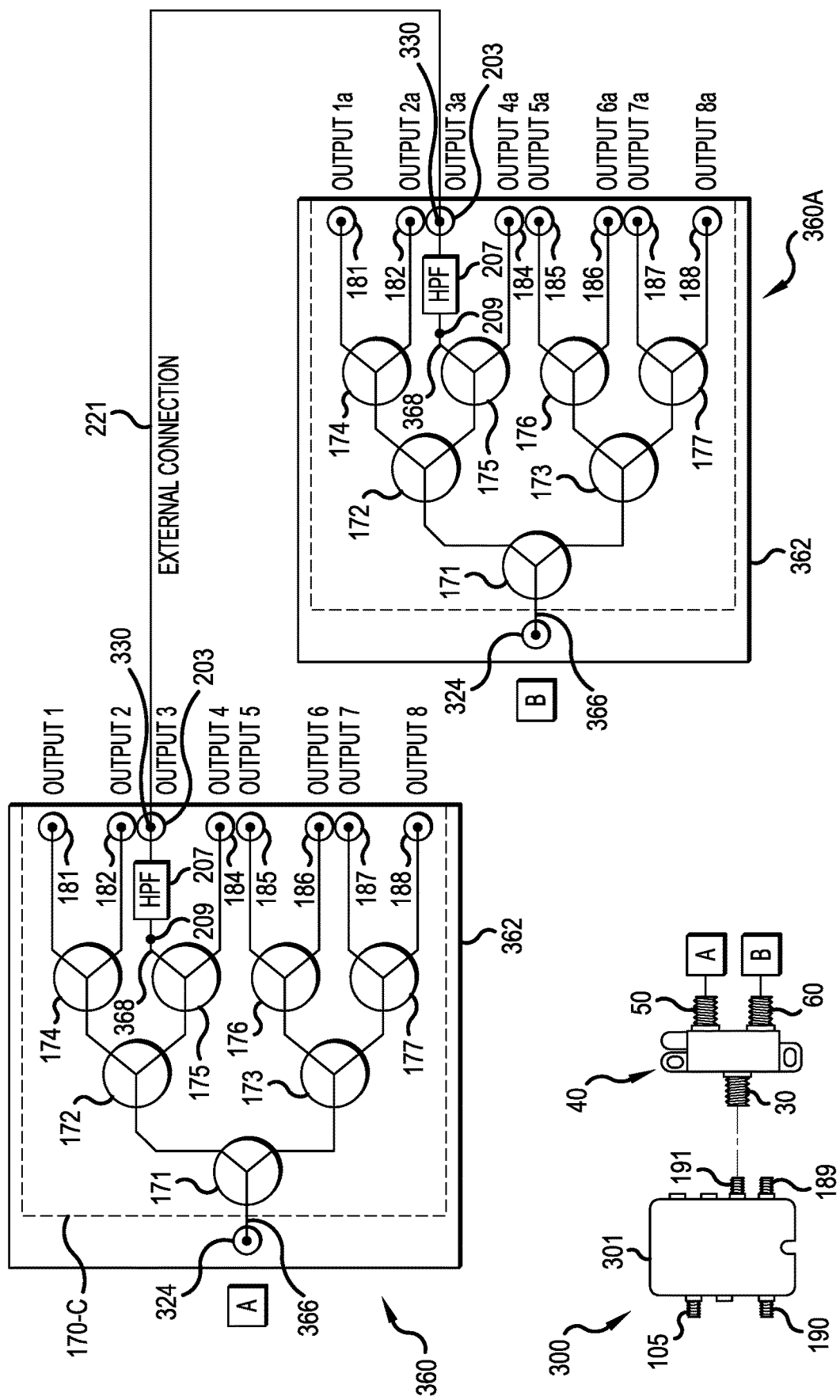
FIG. 12 is a block diagram similar to FIG. 11, but showing an alternative design for the passive splitters.

FIG. 12 shows an alternative passive splitter 360 including a housing 362. An RF input port 324 is formed on an exterior of the housing 362. A power divider network 170-C includes a plurality of CATV/MoCA RF output ports 181, 182, 184, 185, 186, 187 and 188 on the exterior of the housing 362. A CATV or service provider communications path 366 is located within the housing 362 and connects the RF input port 324 to the power divider network 170-C.

A MoCA only input/output port 203 is located on the exterior of the housing 362. A MoCA signal path 368 within the housing 362 connects the power divider network 170-C to the MoCA only input/output port 203. A MoCA pass filter 207 is placed within the housing 362 and located along the MoCA signal path 368. The MoCA pass filter 207 has a first node 209 connected to the power divider network 170-C and a second node 330 connected to the MoCA only input/output port 203.

The power divider network 170-C includes the same tree-type array of plural connected power dividers, as shown in FIG. 7. Particularly, the power divider network 170-C includes a first power divider 171 having a first input forming an initial input for the power divider network 170-C and first and second outputs. A second power divider 172 has a second input and third and fourth outputs, wherein the second input is connected to the first output of the first power divider 171. A third power divider 173 has a third input and fifth and sixth outputs, wherein the third input is connected to the second output of the first power divider 171.

The power divider network 170-C further includes a fourth power divider 174 having a fourth input and seventh and eighth outputs, wherein the fourth input is connected to the third output of the second power divider 172. A fifth power divider 175 has a fifth input and ninth and tenth outputs, wherein the fifth input is connected to the fourth output of the second power divider 172. A sixth power divider 176 having a sixth input and eleventh and twelfth outputs, wherein the sixth input is connected to the fifth output of the third power divider 173. A seventh power divider 177 has a seventh input and thirteenth and fourteenth outputs, wherein the seventh input is connected to said sixth output of the third power divider 173. The seventh, eighth, tenth, eleventh, twelfth, thirteenth and fourteenth outputs are connected to first, second, third, fourth, fifth, sixth and seventh CATV/MoCA RF output ports 181, 182, 184, 185, 186, 187 and 188. The ninth output is connected to the first node 209 of the MoCA pass filter 207.

However, the first node 209 may be connected to other locations within the power divider network 170-C, such as the dashed box locations 219 illustrated in FIG. 8. For example, the first node 209 may be directly connected between an input and an output of power dividers within the power divider network 170-C, or directly connected to only an input of a power divider, or directly connected to only an output of a power divider.

In FIGS. 11 and 12, coaxial cables are used to connect the first and second outputs 50 and 60 of the splitter 40 to the RF input ports 324 of the first and second passive splitters 320/320A and 360/360A. Next, a coaxial cable 221 is used to link the MoCA only input/output ports 203 of the first and second passive splitters 320/320A and 360/360A. By the arrangement of FIG. 11, MoCA signals of the RF output ports 181-188 of the first passive splitter 320 may be communicated back and forth with the RF output ports 181-188 of the second passive splitter 320A. By the arrangement of FIG. 12, MoCA signals of the RF output ports 181, 182, 184, 185, 186, 187 and 188 of the first passive splitter 360 may be communicated back and forth with the RF output ports 181, 182, 184, 185, 186, 187 and 188 of the second passive splitter 360A.

Now with reference to FIG. 9, a method of installing a communication system within a premises will be described. The method includes installing a first bi-directional RF signal amplifier 200 including a first RF input port 105 and a first MoCA only input/output port 203 in a premises, then installing a second bi-directional RF signal amplifier 200A including a second RF input port 105A and a second MoCA only input/output port 203A in the same premises. Then, a technician attaches an RF signal feed 20 from a service provider 10 to the first and second RF input ports 105 and 105A of the first and second bi-directional RF signal amplifiers 200 and 200A. Next, the technician establishes a communication link 221 between the first and second MoCA only input/output ports 203 and 203A of the first and second RF signal amplifiers 200 and 200A. The step of establishing can encompass a physical or wired connection between the first and second MoCA only input/output ports 203 and 203A or a wireless connection between the first and second MoCA only input/output ports 203 and 203A.

In the above method, attaching the RF signal feed 10 from the service provider 10 to the first and second RF input ports 105 and 105A of the first and second bi-directional RF signal amplifiers 200 and 200A may include providing a signal splitter 40. The technician attaches the RF signal feed 20 from the service provider 10 to an input 30 of the signal splitter 40. Then, the technician attaches first and second outputs 50 and 60 of the signal splitter 40 to the first and second RF input ports 105 and 105A of the first and second bi-directional RF signal amplifiers 200 and 200A, respectively.

As used herein, a MoCA pass filter may be a high pass filter which significantly attenuates or blocks the upstream and downstream communications between the service provider and customer devices, and passes frequencies above the upstream and downstream communications between the service provider and customer devices with relatively little to no attenuation. Alternatively, the MoCA pass filter may be a notch filter which functions the same as above but also significantly attenuates frequencies above the MoCA frequencies. Blocking frequencies above the MoCA frequency band can be beneficial in reducing noise issues in the system.

Noise can occur from such household sources as cordless phones, cell phones, wireless alarm system sensors and cameras, WiFi routers and repeaters, connected WiFi devices, etc.

The MoCA pass filter may be designed to pass frequencies in a range of 850 MHz to 1,675 MHz and to attenuate frequencies below and/or above the range. However, sometimes service providers will provide entertainment and information services and/or receive customer data in a bandwidth extending up to or exceeding about 1,000 MHz. Therefore, in another embodiment, the MoCA pass filter passes frequencies in a range of 1,125 MHz to 1,675 MHz and attenuates frequencies below and/or above the range. In either embodiment, the MoCA filter is intended to allow MoCA band frequencies to pass freely therethrough in both directions.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

The invention claimed is:
1. A bi-directional RF signal amplifier comprising:
a housing;
an RF input port on an exterior of said housing for communication with a CATV service provider;
a power divider network within said housing and having a plurality of active RF output ports on said exterior of said housing;
an active communications path within said housing connecting said RF input port to said power divider network, said active communications path including at least one power amplifier to amplify upstream CATV signals or downstream CATV signals passing along said active communications path;
a passive RF output port on said exterior of said housing;
a passive communications path within said housing connecting said RF input port to said passive RF output port, wherein said passive communications path has no power amplifier;
a MoCA only input/output port on said exterior of said housing; and
a MoCA signal path within said housing connecting said power divider network to said MoCA only input/output port, wherein said MoCA only input/output port communicates MoCA signals but does not communicate upstream CATV signals or downstream CATV signals.

2. The bi-directional RF signal amplifier of claim 1, further comprising:
a MoCA pass filter within said housing and located along said MoCA signal path, said MoCA pass filter having a first node connected to said power divider network and a second node connected to said MoCA only input/output port.

3. The bi-directional RF signal amplifier of claim 2, wherein said MoCA input/output port is configured as a female coaxial port.

4. The bi-directional RF signal amplifier of claim 2, wherein said first node is connected upstream of said power divider network between said power divider network and a MoCA rejection filter of said active communications path.

5. The bi-directional RF signal amplifier of claim 2, wherein said first node is connected to a location within said power divider network, wherein said location is between an output of a first power divider of said power divider network and an input of a second power divider of said power divider network.

6. The bi-directional RF signal amplifier of claim 2, wherein said power divider network includes a plurality of connected power dividers, and wherein said first node is directly connected to only an output of an individual power divider within said power divider network.

7. The bi-directional RF signal amplifier of claim 2, wherein said power divider network includes a plurality of connected power dividers, and wherein said first node is directly connected to only an input of an individual power divider within said power divider network.

8. The bi-directional RF signal amplifier of claim 2, further comprising:
a first diplexer having a common port, a high frequency port and a low frequency port, wherein said common port of said first diplexer is coupled to said RF input port and said high frequency port of said first diplexer is coupled to said power amplifier; and
a second diplexer having a common port, a high frequency port and a low frequency port, wherein said high frequency port of said second diplexer is coupled to said power amplifier, and said common port of said second diplexer is coupled to said power divider network.

9. The bi-directional RF signal amplifier of claim 2, wherein said housing is a first housing, said RF input port is a first RF input port, said power divider network is a first power divider network; said plurality of active RF output ports is a first plurality of active RF output ports, said active communications path is a first active communication path, said at least one power amplifier is at least one first power amplifier, said passive RF output port is a first passive output port, said passive communications path is a first passive communications path, said MoCA only input/output port is a first MoCA only input/output port, said MoCA signal path is a first MoCA signal path, and said MoCA pass filter is a first MoCA pass filter, further comprising:
a second housing;
a second RF input port on an exterior of said second housing;
a second power divider network within said housing and having a second plurality of active RF output ports on said exterior of said second housing;
a second active communications path within said second housing connecting said second RF input port to said second power divider network, said second active communications path including at least one second power amplifier to amplify an upstream signal or a downstream signal passing along said second active communications path;
a second passive RF output port on said exterior of said second housing;
a second passive communications path within said second housing connecting said second RF input port to said second passive RF output port, wherein said second passive communications path has no power amplifier;
a second MoCA only input/output port on said exterior of said second housing;
a second MoCA signal path within said second housing connecting said second power divider network to said second MoCA only input/output port;
a second MoCA pass filter within said second housing and located along said second MoCA signal path, said second MoCA pass filter having a first node connected to said second power divider network and a second node connected to said second MoCA only input/output port; and a connection link between said first MOCA only input/output port and said second MOCA only input/output port.

10. The bi-directional RF signal amplifier of claim 8, further comprising:

a directional coupler interposed between said RF input port and said first diplexer, wherein an input of said directional coupler is coupled to said RF input port, a first output of said directional coupler is coupled to said common port of said first diplexer, and a second output of said directional coupler is coupled to said passive communications path leading to said passive RF output port.

11. The bi-directional RF signal amplifier of claim 9, wherein said connection link is a coaxial cable.

12. A passive splitter comprising:

a housing;

an RF input port on an exterior of said housing for communication with a CATV service provider;

a power divider network within said housing and having a plurality of CATV/MoCA RF output ports on said exterior of said housing, wherein said power divider network includes a plurality of connected power dividers;

a CATV communications path within said housing connecting said RF input port to said power divider network and communicating upstream CATV signals or downstream CATV signals;

a MoCA only input/output port on said exterior of said housing;

a MoCA signal path within said housing connecting said power divider network to said MoCA only input/output port; and a MoCA pass filter within said housing and located along said MoCA signal path, said MoCA pass filter having a first node connected to said power divider network and a second node connected to said MoCA only input/output port, wherein said MoCA only input/output port communicates MoCA signals but does not communicate any upstream CATV signals or downstream CATV signals.

13. The passive splitter of claim 12, wherein said first node is connected a location within said power divider network, wherein said location is between an output of a first power divider of said power divider network and an input of a second power divider of said power divider network.

14. The passive splitter of claim 12, wherein said first node is directly connected to only an output of an individual power divider within said power divider network.

15. The passive splitter of claim 12, wherein said first node is directly connected to only an input of an individual power divider within said power divider network.

16. The passive splitter of claim 12, wherein said power divider network includes:

a first power divider having a first input forming an initial input for said power divider network and first and second outputs;

a second power divider having a second input and third and fourth outputs, wherein said second input is connected to said first output of said first power divider; and a third power divider having a third input and fifth and sixth outputs, wherein said third input is connected to said second output of said first power divider.

17. The passive splitter of claim 16, wherein said first node of said MoCA pass filter is connected to an additional output of said first power divider.

18. The passive splitter of claim 16, wherein said power divider network further includes:

a fourth power divider having a fourth input and seventh and eighth outputs, wherein said fourth input is connected to said third output of said second power divider;

a fifth power divider having a fifth input and ninth and tenth outputs, wherein said fifth input is connected to said fourth output of said second power divider;

a sixth power divider having a sixth input and eleventh and twelfth outputs, wherein said sixth input is connected to said fifth output of said third power divider; and a seventh power divider having a seventh input and thirteenth and fourteenth outputs, wherein said seventh input is connected to said sixth output of said third power divider, wherein said seventh, eighth, tenth, eleventh, twelfth, thirteenth and fourteenth outputs are connected to first, second, third, fourth, fifth, sixth and seventh CATV/MoCA RF output ports of said plurality of CATV/MoCA RF output ports, and wherein said ninth output is connected to said first node of said MoCA pass filter.

19. A method of installing a communication system within a premises comprising:

installing a first bi-directional RF signal amplifier including a first RF input port and a first MoCA only input/output port in a premises;

installing a second bi-directional RF signal amplifier including a second RF input port and a second MoCA only input/output port in the same premises;

attaching an RF signal feed from a service provider to the first and second RF input ports of the first and second bi-directional RF signal amplifiers; and establishing a communication link between the first and second MoCA only input/output ports of the first and second bi-directional RF signal amplifiers.

20. The method according to claim 19, wherein attaching the RF signal feed from the service provider to the first and second RF input ports of the first and second bi-directional RF signal amplifiers includes:

providing a signal splitter;

attaching the RF signal feed from the service provider to an input of the signal splitter; and attaching first and second outputs of the signal splitter to the first and second RF input ports of the first and second bi-directional RF signal amplifiers, respectively.

* * * * *